(12) United States Patent
Beeson et al.

(10) Patent No.: US 10,944,634 B1
(45) Date of Patent: Mar. 9, 2021

(54) OPTIMIZATION FOR NETWORK CONNECTIONS

(71) Applicant: Concurrent Ventures, LLC, Johns Creek, GA (US)

(72) Inventors: Jesse D. Beeson, Johns Creek, GA (US); Jesse B. Yates, Atlanta, GA (US)

(73) Assignee: Concurrent Ventures, Johns Creek, GA (US)

( * ) Notice: Subject to any disclaimer, the term of this patent is extended or adjusted under 35 U.S.C. 154(b) by 0 days.

(21) Appl. No.: 16/035,672

(22) Filed: Jul. 15, 2018

(51) Int. Cl.
*H04L 12/24* (2006.01)
*H04L 12/26* (2006.01)

(52) U.S. Cl.
CPC ......... *H04L 41/0896* (2013.01); *H04L 41/12* (2013.01); *H04L 43/0882* (2013.01)

(58) Field of Classification Search
CPC ......... H04L 2012/5608; H04L 12/5602; H04L 47/27; H04L 2012/5635; H04L 47/10; H04L 47/35; H04L 47/30; H04L 47/32; H04W 84/12; H04W 88/08; H04W 88/18; H04W 80/04; H04W 84/18; H04W 88/06; H04W 74/08; H04W 8/10; H04W 72/04; H04W 8/26; H04B 7/2123; H04B 7/212

USPC .... 370/310.2, 328, 338, 322, 329, 332, 341, 370/348, 349, 231, 235
See application file for complete search history.

(56) References Cited

U.S. PATENT DOCUMENTS

| | | | | |
|---|---|---|---|---|
| 2005/0254435 | A1* | 11/2005 | Moakley | H04L 67/16 370/252 |
| 2006/0133307 | A1* | 6/2006 | Fukasawa | H04L 41/0816 370/328 |
| 2008/0080458 | A1* | 4/2008 | Cole | H04W 48/18 370/342 |
| 2009/0209349 | A1* | 8/2009 | Padhye | H04L 67/101 463/42 |

* cited by examiner

*Primary Examiner* — Brenda H Pham

(57) ABSTRACT

A method for network connection optimization is provided. The method includes collecting, at a first endpoint device coupled to a network, parameter values for determination of effective bandwidth of network connections to further endpoint devices. The method includes determining that a next network connection from the first endpoint device to a second endpoint device matches a past network connection or a geographical area or a network topology area of the past network connection. The method includes initiating the next network connection, from the first endpoint device to the second endpoint device, with a transmission bandwidth based on the parameter values for the past network connection.

20 Claims, 8 Drawing Sheets

US 10,944,634 B1

OPTIMIZATION FOR NETWORK CONNECTIONS

BACKGROUND

A TCP/IP (transmission control protocol/Internet protocol) network connection between two endpoints starts off without knowledge of the performance of the connection and the effect of bandwidth realized between the peers. The protocol stack builds up this knowledge over time via various algorithms. Many algorithms induce considerable time loss in order to average out to the effect of bandwidth, and may take many seconds or even minutes to reach full effective bandwidth capacity, but are fairly simple to implement. Other algorithms do a better job at not incurring as great a time loss and may reach full effective bandwidth capacity sooner, but are compute intensive and more difficult to implement. These time delays and sub-optimal transmission bandwidth have significant effect in situations where the network connection involves set up, transfer of data, then tear down, and is repeated over and over again, such as for IoT (Internet of things), database access, website content and/or static asset serving (e.g., images). An improvement to the rapidity at which full bandwidth is achieved for a given network connection would increase communication efficiency to the benefit of the endpoints of the network connection, and users in general. Therefore, there is a need in the art for a solution which overcomes the drawbacks described above.

SUMMARY

In some embodiments, a method for network connection optimization is provided. The method includes collecting, at a first endpoint device coupled to a network, parameter values for determination of bandwidth of network connections to further endpoint devices. The method includes determining that a next network connection from the first endpoint device to a second endpoint device matches a past network connection or a geographical area of the past network connection. The method includes initiating the next network connection, from the first endpoint device to the second endpoint device, with a transmission bandwidth based on the parameter values for the past network connection. The method may include sending the parameter values for determination of bandwidth, from the first endpoint device, to a server that is configured to receive further parameter values for determination of bandwidth of network connections from a plurality of endpoint devices. The method may also include sending, from the first endpoint device to the server, connection information for the next network connection, wherein the server performs the determining and derives one or more parameter values for the transmission bandwidth, and receiving, at the first endpoint device, from the server, the one or more parameter values for the transmission bandwidth.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Endpoints and servers are described herein as network-connected (or connectable) devices that optimize network connections. By using past or recent tuning results when the same network connection or another network connection in a similar geographic area (such as an apartment complex, neighborhood, or city to city or state to state network connection) is made, an endpoint can shorten the startup time. In some embodiments, endpoints store parameters relating to network connections, and later access those parameters to set an initial transmission bandwidth when a next network connection matches a past network connection or a geographical area of a past network connection. In further embodiments, a tuning server receives and stores parameters relating to network connections, from various endpoints, and accesses those parameters to determine an initial transmission bandwidth for an endpoint. The tuning server communicates bandwidth information back to the endpoint that sent connection information to the tuning server, so that the endpoint can use the initial bandwidth when making the next connection to another endpoint. Endpoints then continuously communicate current bandwidth information and/or statistics to the tuning server such that the tuning server is kept up to date. FIGS. 1-6 present embodiments of endpoints, servers and methods for optimizing network connections. FIGS. 7A-10 present embodiments of a configurable server with swappable pods that can implement an endpoint or server as shown in FIG. 1-6 in some embodiments.

Figure 1:
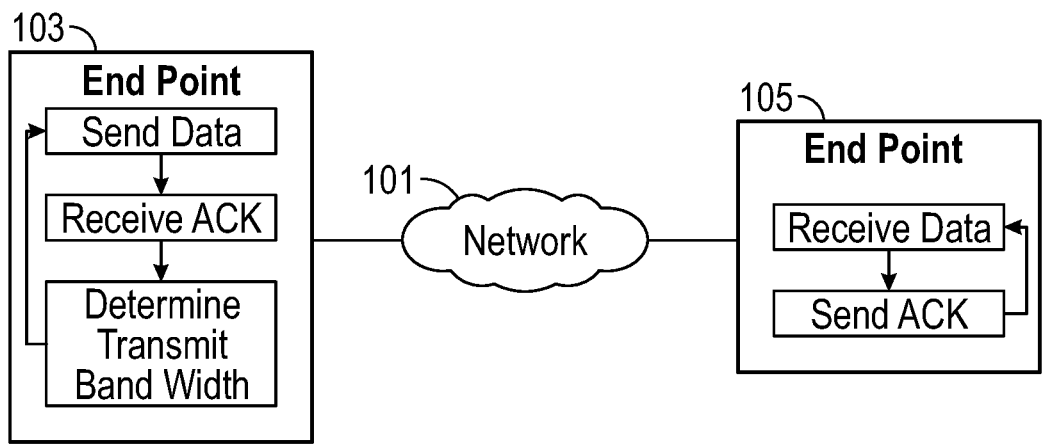
FIG. 1 depicts two endpoints communicating over a network, with the transmitting endpoint determining the transmit bandwidth in accordance with some embodiments.

FIG. 1 depicts two endpoints 103, 105 communicating over a network 101, with the transmitting endpoint 103 determining the transmit bandwidth. The network 101 represents any network, e.g., wired, wireless, fiber-optic, local area (LAN), wide area (WAN), Internet, etc., with switches, routers and other network devices. Each endpoint 103, 105 could be a wireless or wired device, for example with a processor and memory (see FIG. 2) that can couple to a network, e.g., personal computer, server, storage system, personal digital assistant (PDA), touchpad computer, smart phone, IoT (Internet of things) device, etc. In a bidirectional network connection, both endpoints 103, 105 can transmit and receive. For purposes of illustration, the endpoint 103 is transmitting in FIG. 1, but is not limited solely to transmitting.

Continuing with FIG. 1, after having made a network connection through the network 101, the transmitting endpoint 103 sends data, and the receiving endpoint 105 receives the data. The receiving endpoint 105 sends an acknowledge (ack) message in response to receiving the data, and the transmitting endpoint 103 receives the acknowledge message in some embodiments. In some embodiments, receiving endpoint 105 can return any telemetry data relevant to determining the connection quality and in turn, the effective realized bandwidth. In an iterative loop, the transmitting endpoint 103 determines the transmit bandwidth, and continues to send data, receive acknowledgments, and adjust the transmit bandwidth. Generally, the goal is for the transmit bandwidth to not exceed buffer capacities in the network 101 and/or the endpoint 105, in which case packets get dropped. Also, transmit bandwidth should not be so far below maximum bandwidth capability for the connection that data throughput suffers, and long upload, download or other communication speeds are inadequate. Specific to an implementation, the transmitting endpoint 103 executes one of a number of readily available algorithms to determine and adjust transmit bandwidth, and may ramp up slowly or more rapidly to an average bandwidth depending on the algorithm and depending on the fluctuations in the network connection. Network connections may have bottlenecks (intermittent or otherwise) or be reconfigured dynamically. Embodiments further described below seek to improve the rapidity with which the transmitting endpoint 103 achieves the desired average bandwidth, preferably close to maximum bandwidth for the network connection, by storing and accessing information about past network connections to set the initial transmission bandwidth. In some versions, the information is stored locally in the endpoint, which determines the initial transmission bandwidth. In other versions, the information is stored in the tuning server, which determines the initial transmission bandwidth or parameters relating to the initial transmission bandwidth.

Figure 2:
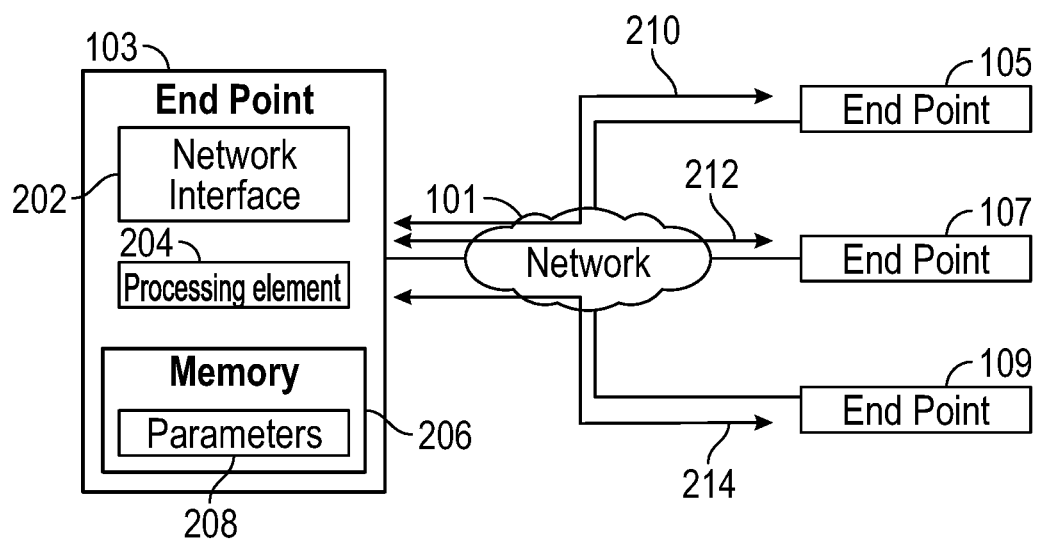
FIG. 2 depicts an endpoint storing parameters relating to network connections to various endpoints, so that an initial bandwidth for the next network connection to an endpoint can be determined based on past network connections in accordance with some embodiments.

FIG. 2 depicts an endpoint 103 storing parameters 208 relating to network connections 210, 212, 214 to various endpoints 105, 107, 109, so that an initial bandwidth for the next network connection to an endpoint can be determined based on past network connections. In one scenario, a processor 204 of the endpoint 103 establishes the network connections 210, 212, 214 through the network interface 202 of the endpoint 103 and through the network 101 to the endpoints 105, 107, 109, and stores parameters 208 relating to those network connections 210, 212, 214 in memory 206 of the endpoint 103. After those network connections 210, 212, 214 have been terminated (or at least, the network connection 210 has been terminated, the others could continue), suppose the endpoint 103 intends to form the next network connection 210 to an endpoint 105, for which one or more parameters 208 have previously been stored in memory 206. The processor 204 could compare the next network connection 210 to previous network connections 210, 212, 214, for example by examining the parameters 208 in memory 206, and find that the next network connection 210 matches a previous network connection 210. In some embodiments, the processor 204 can then look up the network bandwidth of that previous network connection 210, or other related parameter(s) 208 in the memory 206, and set that bandwidth as the initial transmission bandwidth for the network connection 210 to the endpoint 105. If the bandwidth itself is not available as a parameter 208, the processor 204 can determine or estimate the bandwidth from one or more parameters 208. After the network connection 210 is established from the transmitting endpoint 103 to the receiving endpoint 105, the transmitting endpoint 103 can adjust the transmit bandwidth as depicted in FIG. 1 during ongoing transmission of data packets. A related method is described below with reference to FIG. 4. With the initial transmission bandwidth determined and set as above, the delay time that other algorithms incur for ramping up the transmission bandwidth is eliminated, or at least greatly decreased.

Figure 3:
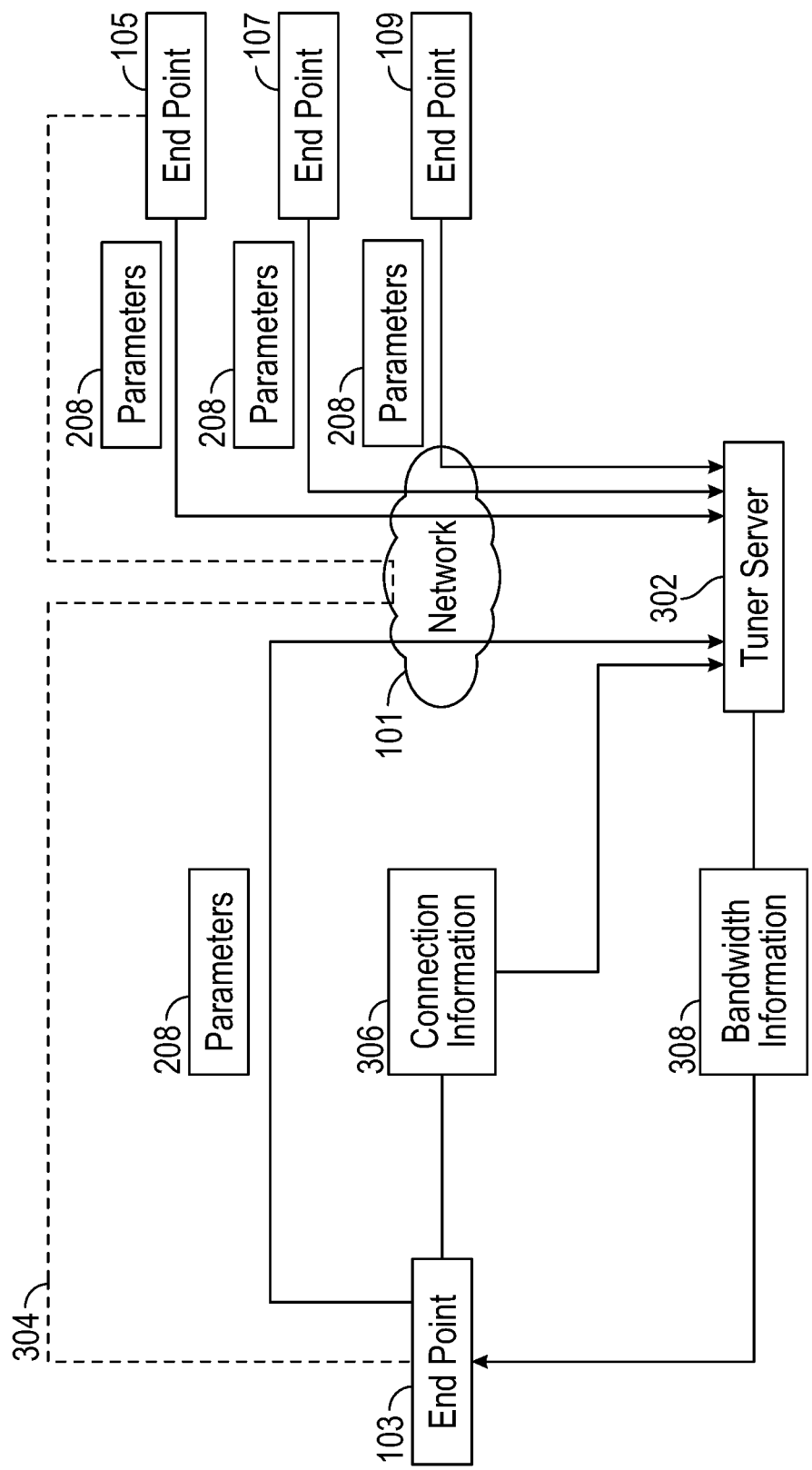
FIG. 3 depicts endpoints sending parameters relating to network connections to a tuning server, and the tuning server sending bandwidth information to one of the endpoints in response to receiving connection information about a next network connection from that endpoint in accordance with some embodiments.

FIG. 3 depicts endpoints 103, 105, 107, 109 sending parameters 208 relating to network connections to a tuning server 302, and the tuning server 302 sending bandwidth information 308 to one of the endpoints 103 in response to receiving connection information 306 about a next network connection 304 from that endpoint 103. Optionally, endpoints 103, 105, 107, 109 could store respective parameters 208 locally. This embodiment offloads the storage and bandwidth determination (e.g., calculations) from the endpoints 103, 105, 107, 109 to the tuning server 302, which is better positioned and equipped to have a broader view of network connections than could any single endpoint. Endpoints may optionally continuously or periodically communicate relevant bandwidth information and/or statistics to the tuning server 302 in an effort to keep the tuning server 302 up to date and well informed.

Still referring to FIG. 3, when an endpoint 103 is setting up for a network connection 304 to another endpoint 105, the endpoint 103 sends connection information 306 about the next network connection 304, to the tuning server 302. With that connection information 306, the tuning server 302 (more specifically, one or more processors in the tuning server 302) can compare the intended network connection 304 to other network connections, for example by examining parameters 208 in memory in the tuning server 302. The tuning server 302 may find that the intended network connection 304 (i.e., next network connection for the requesting endpoint 103) matches one of the other network connections or a geographical area of one of the other network connections. If that is the case, the tuning server 302 determines a communication bandwidth and sends this bandwidth information 308, or alternatively sends one or more of the parameters or information derived from the parameters, as the bandwidth information 308, to the requesting endpoint 103. Then, the requesting endpoint 103 sets the initial transmission bandwidth accordingly for the network connection 304 to the endpoint 105. It should be appreciated that the tuning server 302 has a higher level view of the network traffic and not only offloads the calculations but can also incorporate knowledge of the higher level view of the network topology to enhance congestion control over/among the network(s). The tuning server 302 may then be locally co-located with various endpoints (e.g. with the same data center) or may be geographically diverse. Related methods are described below with reference to FIGS. 5 and 6. The effect on eliminating or greatly decreasing the delay time for ramping up transmission bandwidth is similar in this scenario to that in the scenario depicted in FIG. 2.

Figure 4:
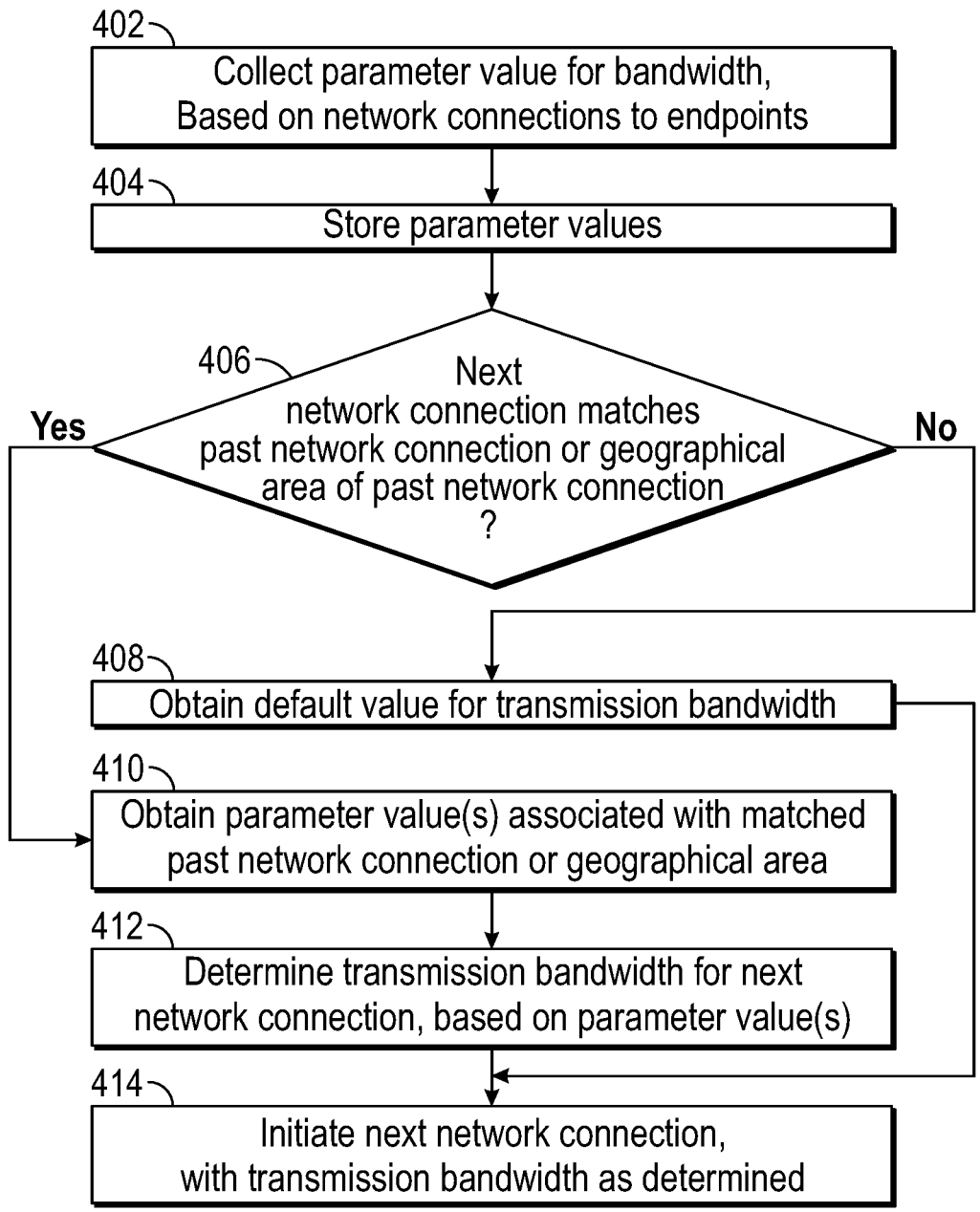
FIG. 4 is a flow diagram of a method for network connection optimization, which can be practiced by an endpoint, as shown in FIGS. 1-3 in accordance with some embodiments.

FIG. 4 is a flow diagram of a method for network connection optimization, which can be practiced by an endpoint, as shown in FIGS. 1-3. More specifically, the method can be practiced by one or more processors of an endpoint. It should be appreciated that the method as shown in FIG. 4 is nonspecific as to where the parameters are stored, and where the determination is made for transmission bandwidth. The method therefore applies to embodiments depicted in both FIG. 2 and FIG. 3, with storage and transmission bandwidth determination in endpoints, and in a tuning server, respectively. In an action 402, parameter values are collected for bandwidth, based on network connections to endpoints. Any suitable parameters to assist in congestion control may be stored in addition to parameters associated with bandwidth of the network connection. Parameter values are stored, in an action 404. For example, the parameter values could be stored in endpoints, or in the tuning server. In a determination action 406, it is determined whether a next network connection, for an endpoint, matches a past network connection or geographical area of a past network connection. If there is no match, flow proceeds to the action 408, to obtain a default value for transmission bandwidth. If the answer is yes, there is a match, flow proceeds to the action 410.

In the action 410 of FIG. 4, one or more parameter values are obtained, as associated with the matched past network connection or geographical area. These parameter values could be obtained from the endpoint, for the endpoint to determine transmission bandwidth, or could be obtained from the tuning server, for the tuning server to determine transmission bandwidth, in various embodiments. In an action 412, the initial transmission bandwidth is determined for the next network connection, based on the one or more parameter values. In an action 414, the next network connection is initiated, by the endpoint, with transmission bandwidth as determined. If the action 414 is joined from the action 408, the initial transmission bandwidth used for the network connection is the default value for transmission bandwidth. If the action 414 is joined from the action 412, the initial transmission bandwidth used for the network connection is the transmission bandwidth as determined based on the parameter value(s). It should be appreciated that numerous parameters may be utilized to assist with the congestion control over the network(s) and while the use of bandwidth is illustrated the embodiments are not meant to be limiting as other parameters, statistics, or telemetry relevant to estimating/calculating the bandwidth may be integrated into the embodiments.

Figure 5:
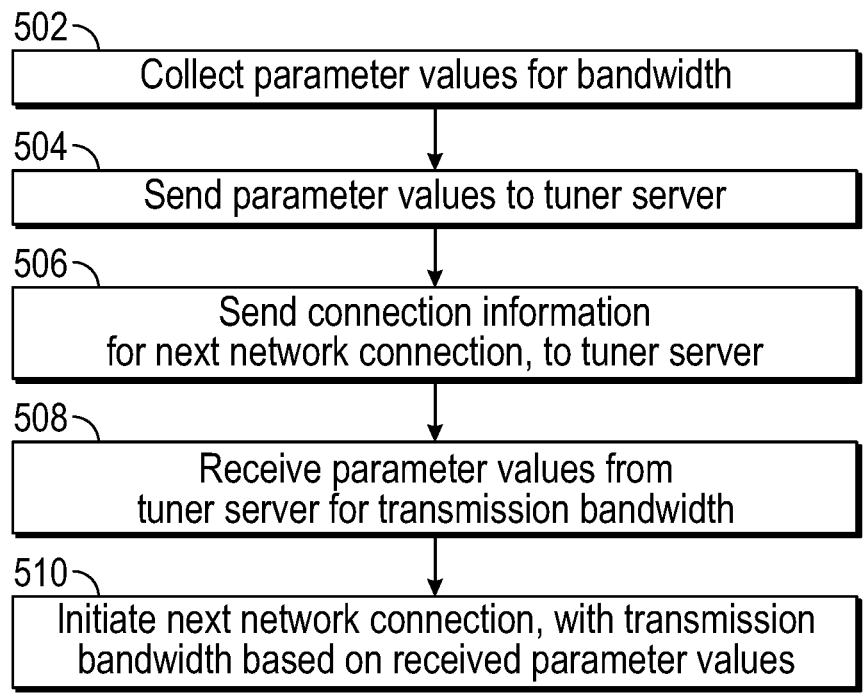
FIG. 5 is a flow diagram of a further method for network connection optimization, which can be practiced by an endpoint communicating with a tuning server, as shown in FIG. 3 in accordance with some embodiments.

FIG. 5 is a flow diagram of a further method for network connection optimization, which can be practiced by an endpoint communicating with a tuning server, as shown in FIG. 3. The method described below may be referred to as endpoint-centric in some embodiments. In an action 502, parameter values are collected for bandwidth, based on network connections between the endpoint and further endpoints. The parameter values are sent to a tuning server, in an action 504. The tuning server, in some embodiments, receives parameter values for network connection bandwidth from multiple endpoints, including the endpoint performing the method of FIG. 5.

In an action 506 of FIG. 5, connection information, for the next network connection of the endpoint, is sent to the tuning server by the endpoint. The tuning server evaluates the connection information for the next network connection, and determines a transmission bandwidth or parameter value(s) relating to the transmission bandwidth. In an action 508, the endpoint receives one or more parameter values from the tuning server, for transmission bandwidth. In an action 510, the endpoint initiates the next network connection, with an initial transmission bandwidth based on the received parameter value(s). With the initial bandwidth so established, the endpoint can then dynamically adjust bandwidth, for example as shown in FIG. 1.

Figure 6:
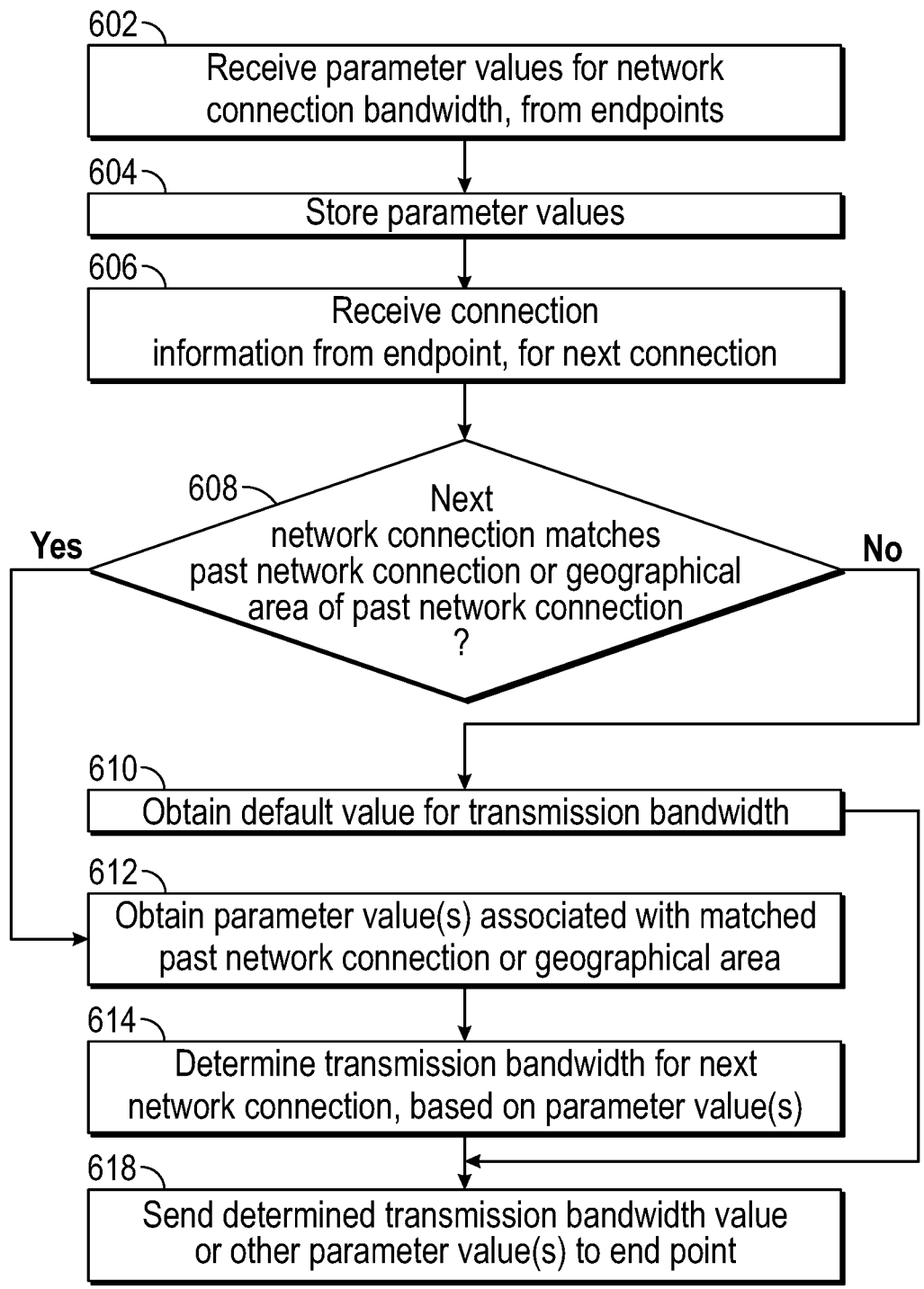
FIG. 6 is a flow diagram of a still further method for network connection optimization, which can be practiced by a tuning server communicating with an endpoint, as shown in FIG. 3 in accordance with some embodiments.

FIG. 6 is a flow diagram of a still further method for network connection optimization, which can be practiced by a tuning server communicating with an endpoint, as shown in FIG. 3. Although related to the method presented in FIG. 5, the method in FIG. 6 may be referred to as server-centric. In an action 602, parameter values are received for network connection bandwidth, from endpoints. These parameter values are based on the network connections among endpoints. In an action 604, the tuning server stores the parameter values. In an action 606, the tuning server receives connection information from an endpoint, for a next network connection to be made by that endpoint. The server interprets receiving the connection information as a request by the endpoint for assistance in determining the initial transmission bandwidth for the next network connection of the endpoint.

In a determination action 608 of FIG. 6, the server determines whether the next network connection matches a past network connection or a geographical area of a past network connection. If the answer is no, the next network connection does not have a match, flow branches to the action 610, where the server obtains the default value for the transmission bandwidth. If the answer is yes, there is a match for the next network connection, flow branches to the action 612. In the action 612, the server obtains one or more parameter values associated with the matched past network connection or geographical area. These parameter values can be obtained from the stored parameter values for network connection bandwidth received from the endpoints, in the action 602. Alternatively, one or more further parameter values can be derived from stored or obtained parameter values in some embodiments. In an action 614, the server determines the transmission bandwidth for the next network connection, based on the parameter value(s). In an action 616, the server sends the determined transmission bandwidth value, or other related parameter value(s), to the endpoint (i.e., the requesting endpoint). The requesting endpoint then uses the transmission bandwidth as the initial transmission bandwidth for the next network connection, which the endpoint establishes to another endpoint. It should be appreciated that while the embodiments for FIGS. 4-6 refer to setting the initial transmission, the methods also provide for the continuous or periodic update of the parameters while the connection exists or is active. Thus, there is a feedback loop that monitors the connection and adjusts the bandwidth accordingly. In some embodiments, if there are no updates to the initial transmission bandwidth, then the initial bandwidth may become the final transmission bandwidth.

Various computing and communication devices, as discussed above, could implement the embodiments described herein. FIGS. 7-10 present a configurable system that could implement various embodiments of endpoints or servers depicted in FIGS. 1-6. In some versions, the router or bridge in the programmable device (see FIG. 9) are suitable candidates, and in other versions, the sandboxes (see FIG. 9) could implement various functions and communicate through the bridge and router. Software modules, hardware modules and various functionality can be developed on one or more pods (see FIGS. 7A-8) or processor cards (see FIG. 10). Further variations are readily devised in keeping with the teachings herein.

Embodiments of a single or multi-chassis server with a variety of flexible features for hardware-defined and software-defined functionality in data streaming and data processing systems, including video, are herein disclosed. The server or system is user-configurable and user-reconfigurable, with user-definable hardware modules and user-definable software modules, to implement data flow processing architectures. Pods and cards are removable, insertable, replaceable and optionally hot-swappable in the chassis. A pod may refer to a module for bulk storage for any type of data and may optionally be referred to as a module or a card. Various combinations of hardware modules, software modules and memories of various types are coupled through a Module Message Interface (MMI) network that supports communication directly among modules. Unlike processor-centric systems with operating systems and hardware subordinate to a centralized processor or group of processors, in many of the embodiments the processors, where present, are considered subordinate to the hardware. It should be appreciated that in some embodiments described herein the workload can be offloaded from a programmable logic device to a processor for tasks that can be done serially and/or slower. A header on Module Message Interface packets specifies chassis, board, module, instance and type identifiers, so that packets in the MMI network are routed to a hardware or software module in a pod or card in the chassis or one of multiple chassis. An FPGA (field programmable gate array), PLD (programmable logic device), ASIC (application specific integrated circuit), or some hybrid of FPGA/PLD/ASIC, which can be used in pods and cards, has a bridge with an MMI router, and one or more sandboxes for user-defined electronic circuits, optionally including processors. Some embodiments use memory superposition, where multiple types of memory, for example multiple types of RAM (random-access memory), are used in a specified data flow. Multiple examples are shown of data flow processing architectures that can be configured from MMI network coupled hardware and software modules in pods and/or cards, in various embodiments.

Figure 7A:
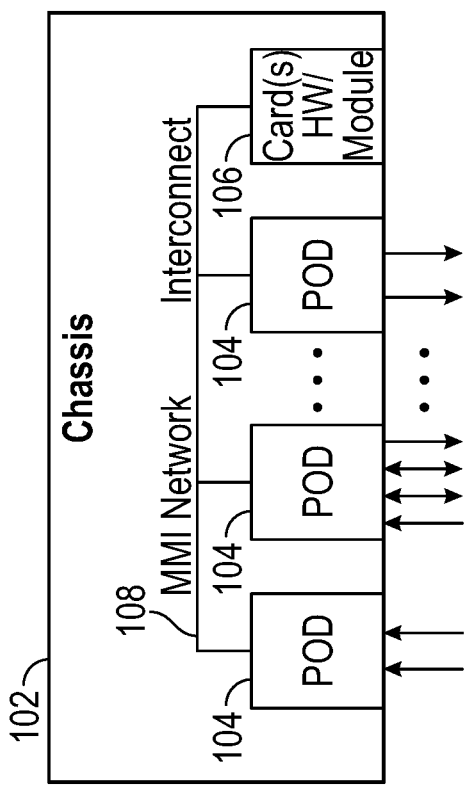
FIG. 7A is a block diagram of a single chassis version of a server with swappable pods and module messaging interface (MMI) network in accordance with some embodiments.

FIG. 7A is a block diagram of a single chassis version of a server with swappable pods 104 and Module Message Interface network. A chassis 102 houses various pods 104 and/or cards 106, and may also have one or more power supplies, fans, rails for sliding pods or cards, connectors, a midplane and/or a backplane, and other fixtures and components commonly used in and available for a chassis. Some or all of the pods 104 and/or cards 106 have one or more inputs, outputs and/or bidirectional ports or connectors, for coupling to external signal or communication sources or destinations. A pod 104 or a card 106 may also have direct connections to one or more other pods 104 or cards 106. Usually, the majority or all of the pods 104 and/or cards 106 have an MMI network connection 108 to each other, although it is possible a pod 104 or card 106 may have only internal connections and connections to another pod 104 or card 106 but no MMI network connection/interconnect 108, for example when a pod 104 or card 106 is a subordinate or slave to another pod 104 or card 106. It should be appreciated that MMI network connection 108 does not specify the physical layer, but refers the protocol in some embodiments and may be referred to as an interconnect. Thus, MMI could layer on PCIe, Ethernet, direct serial or parallel connection, or any other suitable connection. Pods 104 and cards 106 can be identical, i.e., multiple instances of the same type of pod 104 or card 106, or can be differing. One or more routers, for the MMI network, can be internal to the server, or external. In some embodiments, each pod 104 or card 106 has a router.

Figure 7B:
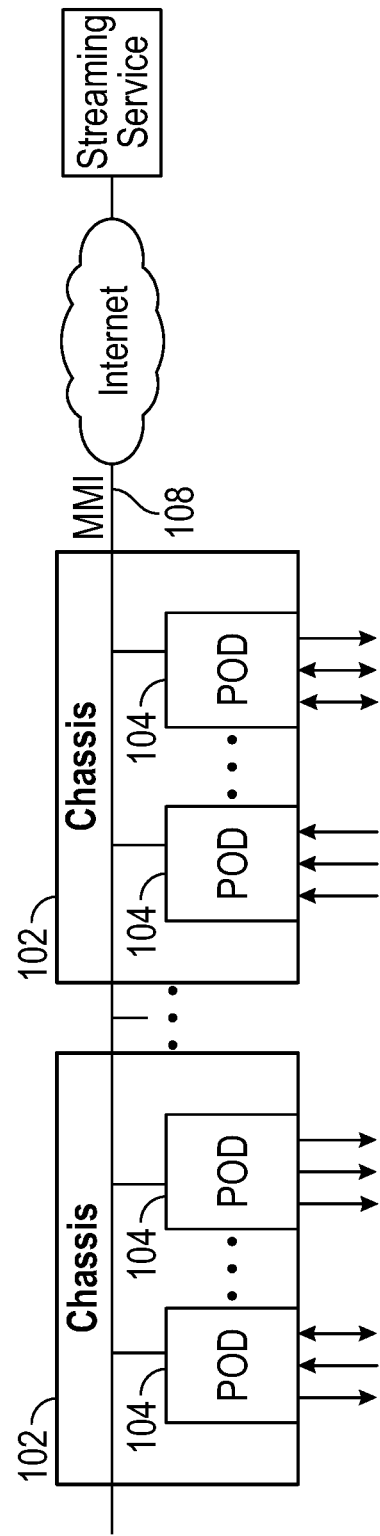
FIG. 7B is a block diagram of a multi-chassis version of a server with swappable pods and module messaging interface network in accordance with some embodiments.

FIG. 7B is a block diagram of a multi-chassis version of a server with swappable pods 104 and Module Message Interface network. As in the single chassis version of FIG. 1A, the pods 104 and/or cards 106 (not shown, but see FIG. 1A) are coupled to the MMI network connection 108 and thus to each other through the MMI network. The MMI network connection/interconnect 108 couples one chassis 102 to each other chassis 102 in the system, for example through electrical or optical cable, and is available for coupling to further components or systems external to the multi-chassis server. Again as in the single chassis version, one or more routers for the MMI network can be internal or external. In some embodiments, each chassis 102 has one or more routers and may be connected to a streaming service via the Internet or some other connection.

Figure 8:
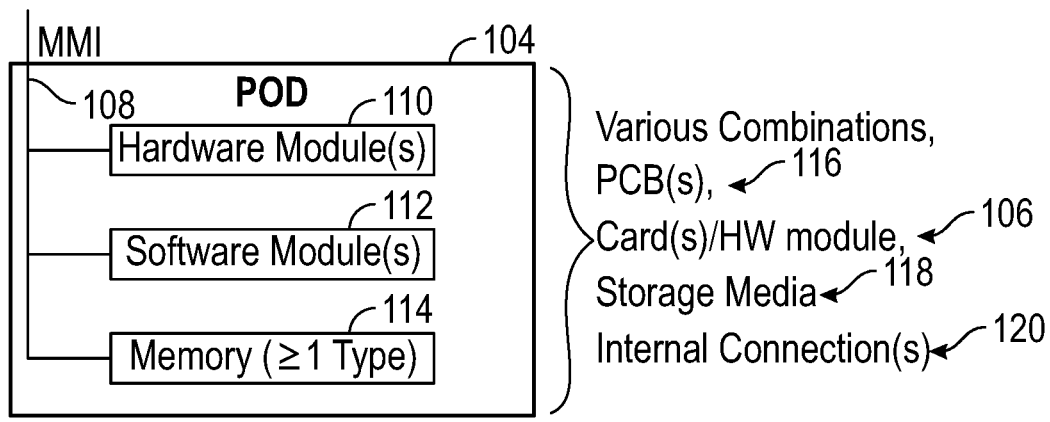
FIG. 8 is a block diagram showing internal components of a pod for the servers of FIGS. 7A and 7B in accordance with some embodiments.

FIG. 8 is a block diagram showing internal components of a pod 104 for the servers of FIGS. 7A and 7B. The pod 104 has an MMI network connection/interconnect 108, which can be made through wiring, fiber optics, signal traces, connector(s), etc., coupled to or coupling one or more hardware modules 110, one or more software modules 112 and/or memory 114, which can be of one or more differing types, in various combinations. One or more printed circuit boards (PCBs) 116, one or more cards 106, and/or one or more storage media devices 118 such as hard disk drives, solid-state drives, optical drives, etc., with various internal connections 120, can be included in various combinations in a pod 104. Internal connections 120 are for the hardware modules 110, software modules 112 and/or memory 114 to couple to the MMI network connection 108, either directly or through other components, and may also include internal connections among modules and/or memory 114 that bypass or do not go through the MMI network connection 108. In some embodiments, internal connections 120 can also include connections among pods 104 and/or cards 106, again bypassing or not going through the MMI network connection 108. An internal connection 120, among or between hardware modules 110, software modules 112, and/or memory 114 in various combinations, could be made by ports, signal lines, buses, hardware FIFO (first in first out) queues, etc. These same components and possibilities apply further to cards 106, which may be of a smaller form factor than a pod 104, and can be inserted into a pod 104 or inserted into a chassis 102 in various embodiments.

Figure 9:
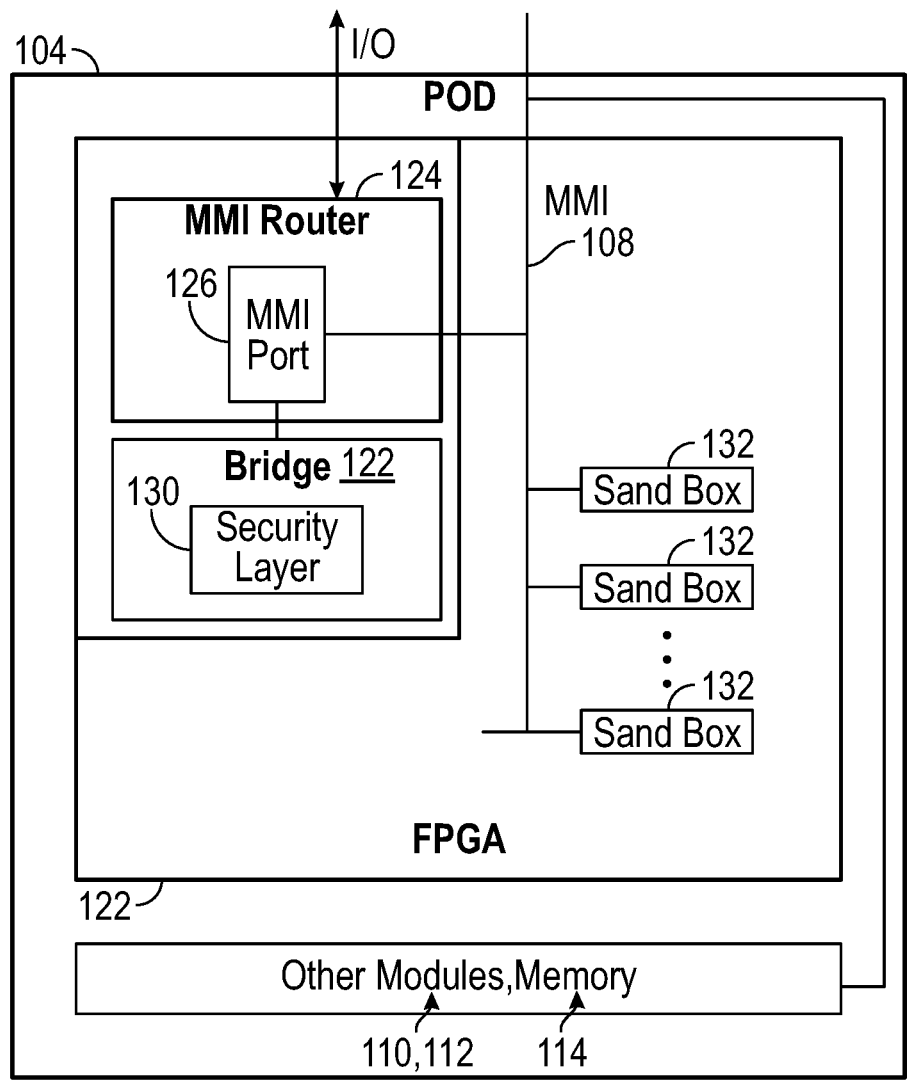
FIG. 9 is a block diagram of a programmable device for the servers of FIGS. 7A and 7B, with a module messaging interface router, a bridge, and sandboxes for configurable modules in accordance with some embodiments.

FIG. 9 is a block diagram of a programmable device for the servers of FIGS. 7A and 7B, with a module messaging interface router 124, a bridge 128, and sandboxes 132 for configurable modules. The programmable device could be, for example, an FPGA 122 as depicted here, a PLD or an ASIC, or more than one of these, or some combination of these, or other programmable device that can configure electronic circuitry, in some versions including one or more processors or controllers. Many such programmable devices are programmed according to a program memory, and are reprogrammable, others are programmed once during manufacturing, for example one time programmable (OTP) or application-specific integrated circuits. In FIG. 3, the programmable device is an FPGA 122 in a pod 104, for example mounted to a printed circuit board that is one of one or more printed circuit boards in the pod 104, but the programmable device could also be in a card 106. In some embodiments of the server, the majority of the pods 104, or all of the pods 104, and the majority of the cards 106, or all of the cards 106 if present in the system, each have a programmable device similar to the one depicted in FIG. 3, or variation thereof.

The FPGA 122 has multiple sections in some embodiments, one of which is a bridge 128 for external communication, for example a serial connection to an external network or a parallel connection to an external bus and shown generally as I/O, and internal communication. The bridge 128 is thus a communication bridge between the outside of the server or system, and internal modules and/or memory, and has one or more ports, I/O for external communication and MIMI for internal (and possibly also external) communication. The bridge 128 is a module that sits on a router port, for purposes of crossing the I/O type or protocol (i.e., from a wide internal parallel bus to PCIe, or Ethernet, etc). The bridge 128 may contain a security layer 130, and in some embodiments is a firewall for MMI message traffic policies. In turn, the MMI network connection 108 connects to one or more sandboxes 132 in other sections of the FPGA, and can connect to other modules 110, 112 and/or memory 114 elsewhere in the pod 104. The bridge 128 can translate between whatever protocol is used on the I/O connection to devices or systems external to the server, and the MIMI network protocol (see FIG. 6). In some embodiments, the MIMI router 124 is hardware-based. In other embodiments, the MIMI router 124 is firmware-based, that is it has a dedicated processing element with dedicated software that is not otherwise user programmable nor part of an operating system. In some embodiments, the MIMI router 124 has both hardware-based and software-based implementations. In some versions, modules communicate to the MMI router 124 and inform the MIMI router 124 of their addresses and/or identifiers, which information the MMI router 124 stores locally, for example in a table. In one embodiment, the MMI router 124 gathers statistics such as communication bandwidth, possibly on a per module basis for analysis, telemetry, decision making, etc. The MMI router 124 could tap off and record messages, or perform predictive analytics, such as determining how close the system is to full capacity of the resources or full capacity of the router itself. In some embodiments source video could come in via MMI, be acted upon, and moved back out via MIMI. The video data could ultimately reach a network port via MMI or go to storage media in some embodiments.

Each of one or more sandboxes 132 on the FPGA 122 is designated for programmable electronic circuits, which could include analog circuitry, digital circuitry, memory, one or more processors or controllers, etc., in various combinations, with the intent of providing user-programmable functionality for user customization of one or more pods 104 or cards 106. For example, a user could define an analog, digital or mixed-signal hardware module 110, or a software module 112 in embodiments with processor or controller availability in the FPGA 122, or more than one of these or some combination of these, in one or more sandboxes 132. In some versions, the bridge 128 is locked to prevent user access, in an FPGA 122 that supports partial reconfiguration, so that a user can configure or reconfigure one or more modules in one or more sandboxes 132, but cannot reconfigure the bridge 128. Configuration or reconfiguration of a sandbox 132 is performed through the MMI network in some versions, through the I/O of the FPGA 122 in other versions, and through the I/O of the FPGA 122, the MMI router 124 and the MMI network in still further versions.

In some embodiments, the bridge 128 has a security layer 130. One of the functions of the security layer 130 could be to protect the circuitry of the bridge, including the MMI router 124 in embodiments that have one, from being reprogrammed. Another function of the security layer 130 could be authentication of a user or other verification of permission to reconfigure a sandbox 132. Various further security functions are readily devised and implemented. In some embodiments the security layer 130 could be a firewall for MMI message traffic based on static or dynamic policy or rules.

Many features could be implemented in the sandboxes 132. User-definable hardware modules and user-definable software modules are possible, and could include dynamic port interfaces to processing elements or other modules, configurable as to data width and/or speed, or direct connect (e.g., serial link or parallel bus) versus hardware queue (e.g., FIFO) or software queue. Dynamic or automatic table creation could be based on what processing elements are connected. Scalable performance and resource utilization is possible. Clock cycle utilization can be regulated, such as for controlling power consumption or thermal characteristics. Port interfaces could support off-chip, off-board and off-chassis routing to processing elements. Ports can be defined so that no single processing element can stall the router. In some embodiments one or more sandboxes 132 could be logically or physically combined to form a larger sandbox with additional MMI access resources or capability. Sandboxes 132 can be of differing resource sizes and MMI ports 126. It should be appreciated that sandboxes 132 may present one common and unified interface that couples the sandboxes 132 to a network of other resources which may or may not include other sandboxes 132 in some embodiments.

High-speed message passing mechanisms between processing elements, between processing elements and hardware, or between or among hardware modules 110 can be defined in hardware (i.e., electronic circuits without processor intervention) to route messages containing source and destination identifiers (see example MMI packet in FIG. 6) more quickly and efficiently than typical software-based mechanisms. Use of dedicated hardware for message passing avoids the general problems and time delays/latency of software-based mechanisms, such as required uses of mutex (a lock, based on mutual exclusion) or semaphores, memory bandwidth consumed as a result of memory thrashing, cache coherency issues, time loss with cache flushes or inefficiencies of bypassing cache, difficulty in debugging software, etc.

In the FPGA 122, multiple processing elements, e.g., processors or processor cores may be available. Dedicating one or more processors or processor cores to a task or function may be computationally more efficient than multithreading or multitasking with a single, more powerful processor or core, as a result of true parallel processing and eliminating software overhead for the multithreading or multitasking.

By deeply embedding processing elements in hardware, tasks can be highly integrated into hardware offload and acceleration modules. Hardware modules 110 can form an extension of processing elements, which are running software. Hardware offload/acceleration modules may extend software in a coprocessor type situation or may perform much larger intelligent tasks. The combination is a hybrid hardware+software processing element, where the software provides a thin layer that interconnects all of the hardware submodules. In many such embodiments, the FPGA 122 directly bridges together the network interfaces, hardware modules 110, software modules 112, and various types of memory and storage media devices for the data flow and data path. Thus, the critical data flow path does not loop through an application CPU with operating system (OS), but is instead bridged with a multiplicity of deeply embedded processing elements. System performance is maximized with hybrid hardware and software data processing.

Figure 10:
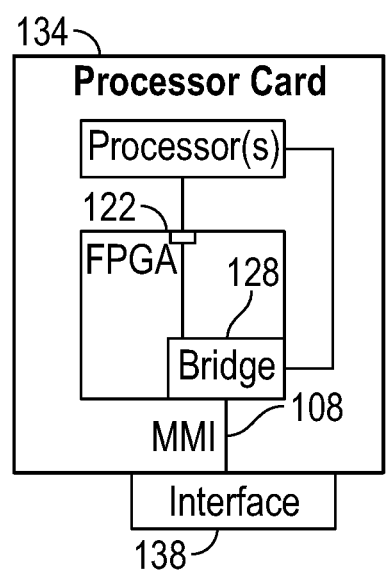
FIG. 10 is a block diagram of a processor card for the servers of FIGS. 7A and 7B in accordance with some embodiments.

FIG. 10 is a block diagram of a processor card 134 for the servers of FIGS. 7A and 7B, one or more processors 136 are available for software modules 112, processing tasks, configuration of components in the system, etc. Communication with the processor(s) 136 is through the FPGA 122, one or more bridges 128, and the MMI network connection 108 and an interface 138, which could be a port or connector. Possible uses for a processor 136 include offloading hardware tasks to software, orchestrating data flows, orchestrating configurations or reconfigurations of hardware modules 110 and/or software modules 112, and executing software from software modules 112 when or if a processor is not available elsewhere, e.g., in a sandbox 132 or another card 106 or pod 104. Processors 136 can be allocated as a resource, in some sense as a virtual computing resource. Embodiments of the processor card 134 can be inserted into a chassis 102 or a pod 104, or integrated into a pod. Ease of replacement, upgrade or addition of a processor card 134 confers flexibility in computing resources for the server.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for network connection optimization, comprising:

collecting, at a first endpoint device coupled to a network, parameter values for determination of bandwidth of network connections to further endpoint devices;

determining at a tuner server, distinct from the first endpoint device and the further endpoint devices, that a next network connection from the first endpoint device to a second endpoint device matches a geographical area of a past network connection; and initiating the next network connection, from the first endpoint device to the second endpoint device, based on the determination at the tuner server, with a transmission bandwidth based on the parameter values for the past network connection.

2. The method of claim 1, further comprising:

sending the parameter values for determination of bandwidth; from the first endpoint device, to the tuner server that is configured to receive further parameter values for determination of bandwidth of network connections from a plurality of endpoint devices;

sending, from the first endpoint device to the tuner server, connection information for the next network connection, wherein the tuner server performs the determining and derives one or more parameter values for the transmission bandwidth; and receiving, at the first endpoint device, from the tuner server, the one or more para values for the transmission bandwidth.

3. The method of claim 1, wherein the initiating is executed by the first endpoint device.

4. The method of claim 1, wherein the determining and the initiating are executed external to the first endpoint device and communicated to the first endpoint device.

5. The method of claim 1, further comprising:

monitoring network traffic between the first endpoint device and the second endpoint device; and adjusting the transmission bandwidth based on the monitoring.

6. The method of claim 1, further comprising:

monitoring network traffic between the first endpoint device and the second endpoint device;

transmitting data associated with the network traffic from the first endpoint to the tuner server;

determining, at the tuner server, an adjustment to the transmission bandwidth is desired;

receiving data for adjusting the transmission bandwidth from the tuner server; and adjusting the transmission bandwidth responsive to the receiving.

7. The method of claim 6, wherein the tuner server incorporates knowledge of a network topology for the determining.

8. A tangible, non-transitory, computer-readable media having instructions thereupon which, when executed by a processor, cause the processor to perform a method comprising:

collecting, at a first endpoint device coupled to a network, parameter values for determination of bandwidth of network connections to further endpoint devices;

determining at a tuner server, distinct from the first endpoint device and the further endpoint devices, that a next network connection from the first endpoint device to a second endpoint device matches a geographical area of a past network connection; and initiating the next network connection, from the first endpoint device to the second endpoint device, based on the determination at the tuner server, with a transmission bandwidth based on the parameter values for the past network connection.

9. The method of claim 8, further comprising:
sending the parameter values for determination of bandwidth, from the first endpoint device, to the tuner server that is configured to receive further parameter values for determination of bandwidth of network connections from a plurality of endpoint devices;
sending, from the first endpoint device to the tuner server, connection information for the next network connection, wherein the tuner server performs the determining and derives one or more parameter values for the transmission bandwidth; and
receiving, at the first endpoint device, from the tuner server, the one or more parameter values for the transmission bandwidth.

10. The method of claim 8, wherein the initiating is executed by the first endpoint device.

11. The method of claim 8, wherein the determining and the initiating are executed external to the first endpoint device and communicated to the first endpoint device.

12. The method of claim 8, further comprising:
monitoring network traffic between the first endpoint device and the second endpoint device; and
adjusting the transmission bandwidth based on the monitoring.

13. The method of claim 8, further comprising:
monitoring network traffic between the first endpoint device and the second endpoint device;
transmitting data associated with the network traffic from the first endpoint to the tuner server;
determining, at the tuner server, an adjustment to the transmission bandwidth is desired;
receiving data for adjusting the transmission bandwidth from the tuner server; and
adjusting the transmission bandwidth responsive to the receiving.

14. The method of claim 13, wherein the tuner server incorporates knowledge of a network topology for the determining.

15. A network connected device, comprising:
one or more processors, coupled to a network port and configurable to:
collect; at a first endpoint device coupled to the network; parameter values for determination of bandwidth of network connections to further endpoint devices;
determine at the network connected device acting as a tuner server, distinct from the first endpoint device and the further endpoint devices, that a next network connection from the first endpoint device to a second endpoint device matches a geographical area of a past network connection; and
initiate the next network connection, from the first endpoint device to the second endpoint device, based on the determination at the network connected device acting as the tuner server, with a transmission bandwidth based on the parameter values for the past network connection.

16. The network connected device of claim 15, wherein the one or more processors are configurable to:
send the parameter values for determination of bandwidth, from the first endpoint device, to the tuner server that is configured to receive further parameter values for determination of bandwidth of network connections from a plurality of endpoint devices;
send, from the first endpoint device to the tuner server, connection information for the next network connection, wherein the tuner server performs the determining and derives one or more parameter values for the transmission bandwidth; and
receive, at the first endpoint device, from the tuner server, the one or more parameter values for the transmission bandwidth.

17. The network connected device of claim 15, wherein the initiating is executed by the first endpoint device and wherein the first endpoint device is contained within the network connected device.

18. The network connected device of claim 15, wherein the determining and the initiating are executed external to the first endpoint device and communicated to the first endpoint device.

19. The method of claim 15, further comprising the network connected device configurable to:
monitor network traffic between the first endpoint device and the second endpoint device; and
adjust the transmission bandwidth based on the monitoring.

20. The network connected device of claim 15, further comprising the network connected device configurable to:
monitor network traffic between the first endpoint device and the second endpoint device;
transmit data associated with the network traffic from the first endpoint to the network connected device;
determine, at the network connected device, an adjustment to the transmission bandwidth is desired;
receive data for adjusting the transmission bandwidth from the network connected device; and
adjust the transmission bandwidth responsive to the receiving.

* * * * *